Nov. 26, 1957 S. D. POOL ET AL 2,814,209
REMOTE CONTROL GEAR SHIFTING MECHANISM
Filed Sept. 12, 1955 4 Sheets-Sheet 4
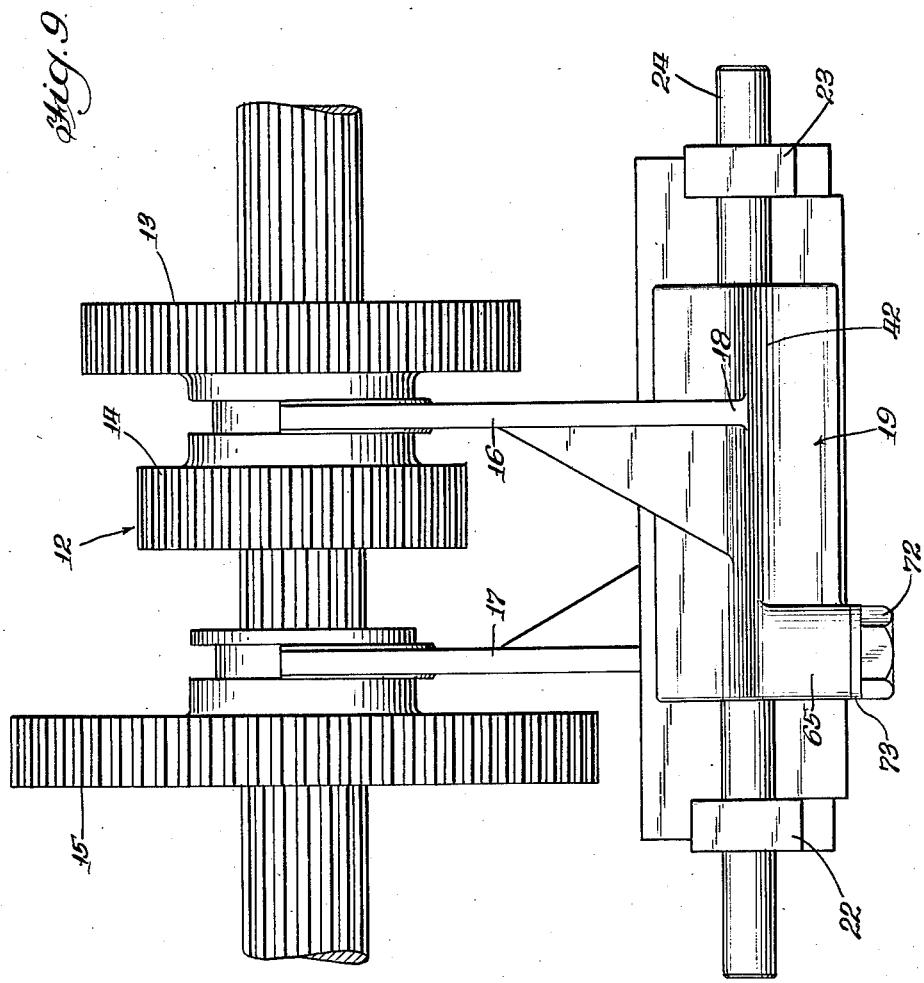
INVENTORS
Stuart D. Pool
Rexford D. Downing
Paul O. Pippel
Atty.

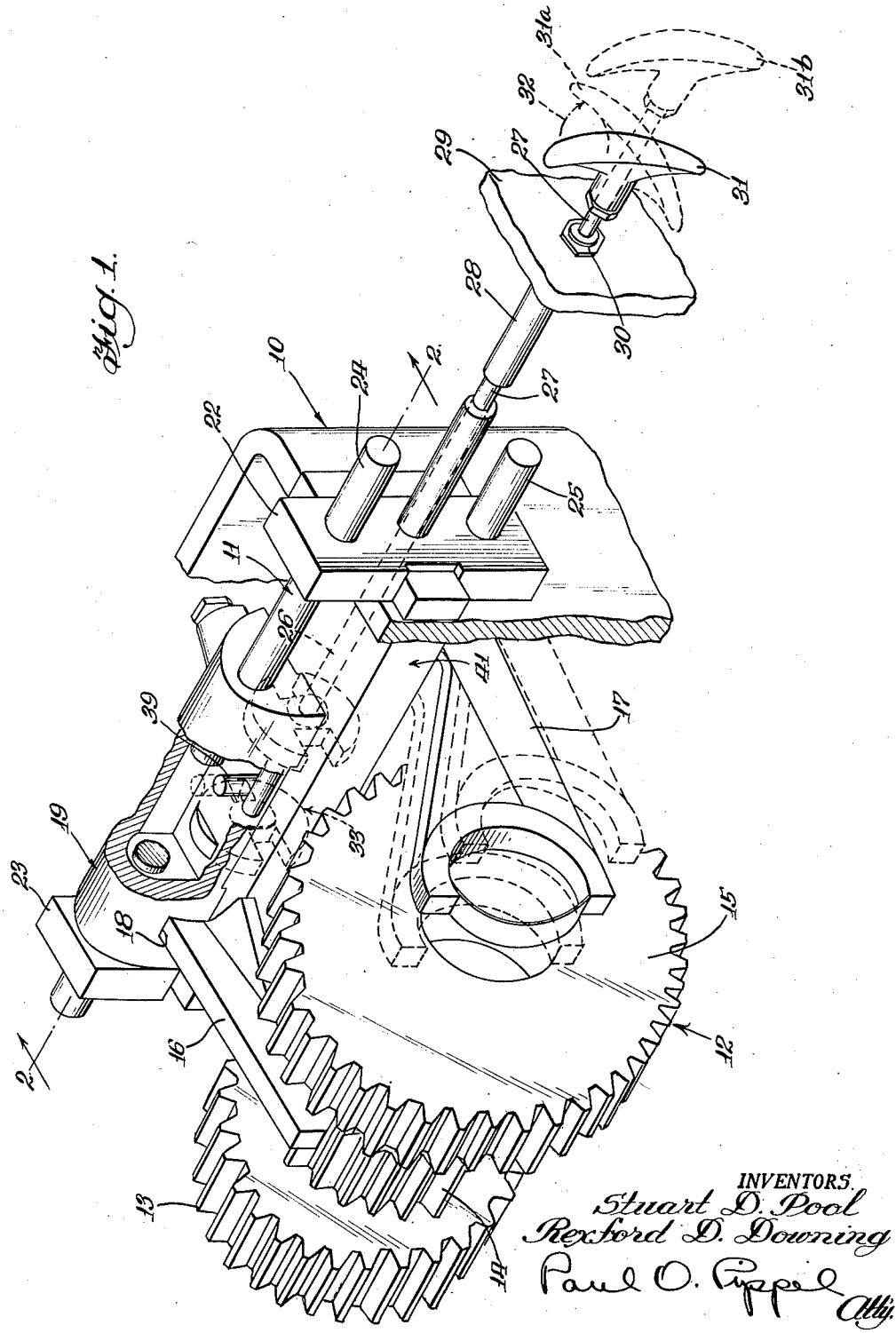

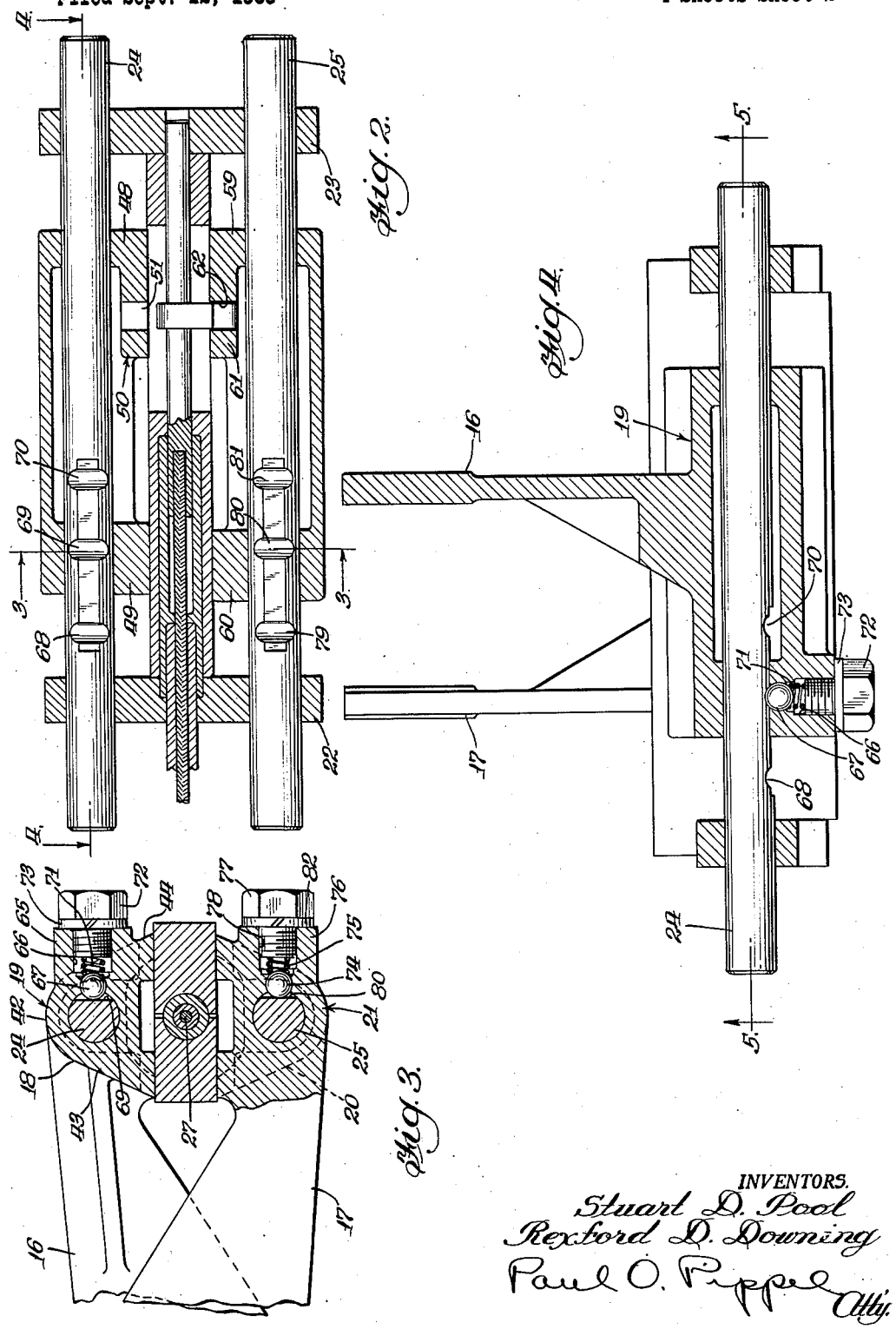

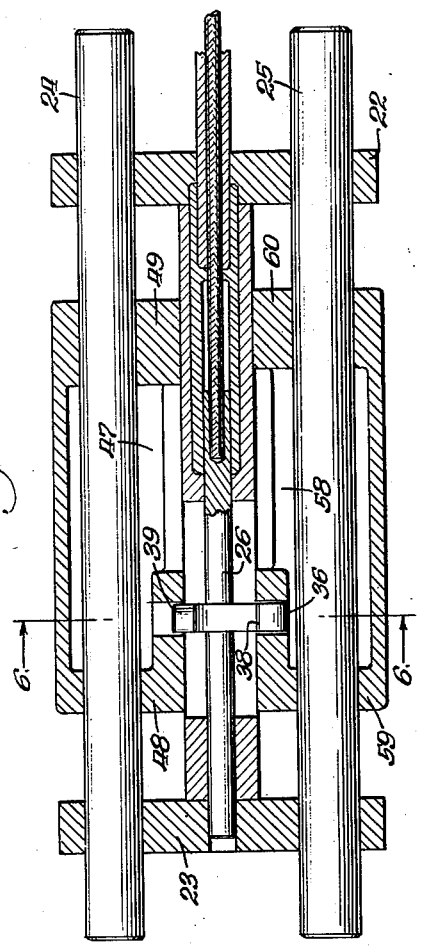

United States Patent Office 2,814,209
Patented Nov. 26, 1957

2,814,209

REMOTE CONTROL GEAR SHIFTING MECHANISM

Stuart D. Pool, Moline, and Rexford D. Downing, Rock Island, Ill., assignors to International Harvester Company, a corporation of New Jersey Application September 12, 1955, Serial No. 533,686

4 Claims. (Cl. 74—477)

This invention relates to a new and improved remote control gear shifting mechanism.

The remote shifting of gears such as in a transmission for motor vehicles is a serious problem and one confronting the engineers in today's industry. Obviously there are many ways of shifting gears and these may take the form of electrical, hydraulic or mechanical means. The present invention is directed to a mechanical means for effecting the shifting of transmission gears from a remote station. In mechanically controlled remote gear shift mechanisms it has been difficult, if not impossible, to determine the position of the gear mechanism and to be able to ascertain the gearing arrangement of the transmission at any particular moment.

It is, therefore, a principal object of the present invention to provide a manually operable mechanical remote control gear shift mechanism arranged and constructed to positively effect a shifting of gears in a transmission.

An important object of this invention is the provision of means in a gear transmission for accomplishing a shifting to either of two ranges of gearing and to simultaneously lock the other of the gear ranges.

Another important object of this invention is to supply a remote control for gear shift mechanisms in which a manually rotatable latch member is adapted to have means engage either of two sets or ranges of gears in the transmission and cause joining with either of said transmission ranges whereby longitudinal movement of the member rotated will effect a longitudinal movement of the engaged gear range mechanism.

Another and still further important object of this invention is to equip a remote control gear shift mechanism of the type having two speed ranges and shifting elements in each of the gear ranges arranged to have a locking pin shiftable from one to the other whereby when the shifting control is engaging one range the locking pin is automatically engaged and barring movement of the other gear range.

A still further important object of this invention is to provide a remote control gear shift mechanism in which a flexible cable may be both rotated and moved longitudinally to effect first a locking of the pulling mechanism with one of the gear elements and a locking of the other of the gear elements to a stationary portion of the device whereby one gear element may be shifted in the gear mechanism separate and apart from the other gear element.

Other and further important objects and advantages will become apparent from the disclosures in the following specification and accompanying drawings.

In the drawings:

Figure 1 is a perspective view of the remote control gear shifting mechanism of this invention with a gear transmission therewith;

Figure 2 is a sectional view taken on the line 2—2 of Figure 1;

Figure 3 is a sectional view taken on the line 3—3 of Figure 2;

Figure 4 is a sectional view of the device taken on the line 4—4 of Figure 2;

Figure 5 is a sectional view similar to Figure 2 showing a changed position of the components and taken on the line 5—5 of Figure 4;

Figure 6 is a sectional view taken on the line 6—6 of Figure 5;

Figure 7 is another sectional view similar to Figures 2 and 5 and discloses another position of the changing gear mechanism;

Figure 8 is a sectional view taken on the line 8—8 of Figure 7; and

Figure 9 is a top plan view of the remote control device of this invention in association with a transmission.

As shown in the drawings, the reference numeral 10 indicates generally a supporting structure for the device of this invention. The supporting structure 10 carries a mechanism generally designated 11 which may be remotely controlled to effect actuation of the transmission having an overall designation of 12. The transmission is mounted on and with the supporting structure 10 by means not shown. The transmission 12 includes a plurality of gears 13, 14 and 15 with which we are directly concerned. Obviously the transmission may have many more gear elements but they do not form a part of the present invention. We are concerned here only with the effective shifting of the movable gear parts of the transmission. Also shown in the transmission are fork shifting arms 16 and 17. The inner end 18 of the fork arm 16 is attached to and forms an integral or unitary part with the slidable element 19 of the shifting mechanism of this invention. Similarly the inner end of the arm 17 is attached at 20 to the shiftable element 21 as best shown in Figure 3. The elements 19 and 21 are adapted to move relatively to each other to effect either a shifting of the fork arm 16 or the fork arm 17. The device is constructed to provide for the locking of the one element, either 19 or 21, when the other one is being shifted.

As best shown in Figure 1, the supporting structure 10 includes a vertically disposed end post or bar 22 to support one end of the shifting mechanism 11. The other end of the shifting mechanism is provided with a corresponding spaced apart post 23 which lies parallel to the bar 22. A fixed circular rod 24 is adapted to span the vertical posts 22 and 23 and is fixed therethrough. The shiftable element 19 is arranged and constructed to slide axially along the rod 24 between the posts 22 and 23 by means which will hereafter be described. A second circular rod 25 is spaced parallel to and beneath the rod 24 and also is fixedly carried through and within the spaced apart posts 22 and 23. In this instance the lower shiftable element 21 is slidable on and over the rod 25 between the posts 22 and 23.

Intermediate the circular supporting rods 24 and 25 is an elongated rod member 26 which may have joined thereto, as shown in Figure 1, a flexible cable 27 of the Bowden wire type which may be extended to some remote position. A sleeve 28 through which the cable slides is held fixedly within a panel member 29 by means of lock nuts 30. The cable 27 continues through the sleeve 28 outwardly beyond the front face of the panel 29 whereupon it is provided with a handle 31 fixedly attached to the outer end. The handle 31 is thus used for causing axial endwise movement of the center rod 26 or rotational movement about the axis of the rod 26. The rotational movement of the rod 26 through the medium of the flexible cable 27 is accomplished, as shown in Figure 1, by means of the dotted line position 31a of the handle 31 rotated in the direction of the arrow 32. The endwise movement of the rod 26 is shown accomplished by the outward position of the handle 31 shown in dashed lines at 31b and spaced outwardly from the full line position of the handle 31. In order that there be no confusion in the positionings of the handle 31, the rotated position of the handle is indicated by the numeral 31a and the extended position of the handle 31 is shown at the position 31b.

The rod 26 is journaled within the spaced end bars 22 and 23 in a substantially central position between the vertically spaced apart rod members 24 and 25. As best shown in Figure 6, the rod 26 has fixedly attached at the end thereof a joining element 33 which is in somewhat the shape of an anchor. The anchor-shaped element 33 has a hub portion 34 to receive the rod 26 and as shown in Figure 6 has a downwardly projecting portion 35 which terminates in an enlarged semi-circular extension 36. The semi-circular periphery in this view is on the lower outside of the actuator element 33 and constitutes the outer periphery of that bottom portion. The semi-circular portion 36 is equipped with lateral side flanges or shoulders 37 and 38 which are adapted alternately to effect vertical reciprocating movement of a locking pin or the like 39. It should thus be understood that as the central rod 26 is actuated either in endwise movement or rotational movement by corresponding movement of the flexible cable 27 through the handle 31 at the remote station that the anchor-shaped element 33 will have corresponding movement.

The pin 39 which is capable of vertical movement both upwardly and/or downwardly is journally mounted within a side frame member 40 which is carried on the supporting structure 10 from the front post 22 to the rearward post 23 and thence around the back side of the shifting mechanism 11, as shown at 41 in Figures 6 and 8. The shape of the members 19 and 21 is material to the operation of the device of this invention. As best shown in Figures 3, 6 and 8, the member 19 is substantially triangular in shape with a rounded top surface as shown at 42. The sides of the triangular shaped element 19 taper downwardly and outwardly as shown at 43 and 44 in Figures 3 and 6. The lower ends of the sides 43 and 44 are shaped as feet 45 and 46 which are adapted to ride on the top surface of the frame member 40 and its rearward side 41. As previously stated, the element 19 is journally carried on the rod-like member 24. This rod member 24 passes through substantially the top portion of the triangular shaped member 19. Figures 5 and 6 best shows the hollow interior portion 47 of the member 19. The front and rear ends respectively shown at 48 and 49 enclose the hollow interior 47. The front end 48 as shown in Figure 2 has a rearwardly extending flange member 50 with a notch or opening 51 therein. The opening 51 is spaced rearwardly of the front wall 48. The flange 50 is of a length commensurate with the longitudinal shifting movement of the element 19 for reasons which will be subsequently described. The space or opening 51 defined in the flange 50 constitutes the receiving space for the rotatable anchor-shaped member 33 on the rod 26.

The construction of the lower slidable member 21 is identical to that of the upper member 19. The outer shape is substantially triangular with a rounded top or bottom portion 53 and side members which extend downwardly or upwardly and outwardly as shown at 54 and 55. These side members 54 and 55 terminate in feet 56 and 57 which ride on the under surface of the member 40—41 in the same manner as the feet 45 and 46 of the member 19 slide on the top surface thereof. The interior of the member 21 is hollow as shown at 58 and the element is enclosed fore and aft by means of a front wall 59 and a rear wall 60. Here again a flange 61 extends rearwardly and parallel to the flange 50 but spaced therebeneath. A notch or opening 62 is formed in the flange 61 at a position spaced rearwardly of the front wall 59. The space or opening 62 is for the purpose of receiving the anchor-shaped element 33 therein when that element is swung downwardly.

As best shown in Figure 2, the anchor-shaped joining element 33 is in the opening 62 within the slidable element 21. In this position the ledge or shoulder 37 has forced an upward sliding of the locking pin 39 as shown in Fig. 5 so that the top portion of the pin 39 projects within the opening 51 in the top element 19. In the operation of the device and for the purpose of effecting a shifting of the gears herein, the flexible cable through the medium of the handle 31 is pulled longitudinally and this, of course, causes movement of the rod 26 and lengthwise movement of the anchor-shaped element 33. Such longitudinal movement causes concurrent longitudinal movement of the bottom slidable element 21. This obviously has resulted in a lateral shifting of the fork member 17 with resultant shifting effect on the large gear 15 of the transmission. It will also be evident from the device as shown in Figures 6 and 8 that when the semi-circular portion 36 of the anchor-shaped element 33 is in one of the openings 51 or 62 the extended end of the locking pin 39 will be in the opposite recess, either 51 or 62. This means that endwise movement of the rod 26 will effect a shifting movement of either of the elements 19 or 21 while the element not being moved will be held in fixed position by reason of the locking pin 39. The shifting of the locking pin 39 is automatically accomplished by the rotation of the element 33 upon rotating the handle 31 as indicated in Figure 1 by the arrow 32. In the device as shown in Figure 6 and as previously explained, the pin 39 is held in an uppermost position to effect a locking of the slidable element 19 by reason of the ledge or shoulder 37 of the semi-circular shaped element 36 having pushed the pin 39 upwardly. Even though the element 33 departs from the position of the pin 39 when it is moved endwise to effect a movement of the element 29, the pin 39 remains in its uppermost position because it rides on the flange 61. In other words, there is no room for the pin 39 to fall downwardly because of the rearwardly extending flange or ledge 61. It was previously stated in the specification that the length of the ledge 61 had a definite relation with respect to the amount of endwise movement available to the slidable element 19 or 21 and it will thus be realized that the purpose of these ledges 50 for the element 19 and 61 for the element 21 prevent the pin 39 from movement either upwardly or downwardly during slidable movement of either of the elements 19 or 21.

Attention now is directed to Figure 8 of the drawings wherein the element 33 has been rotated causing the shoulder 38 thereof to swing around over the top of the carrier member 40—41 and strike the top of the pin 39 causing the bottom thereof to move downwardly into the recess 62 within the slidable member 21. Rotational movement of the handle 31 which is remotely positioned from the transmission should be made only when the flexible cable 27 is in an inward position corresponding to the position of the rod 26 when both of the elements 19 and 21 are in a rearward position, as shown in Figure 2. After the rotation of the rod 26 and the element 33 to the position as shown in Figure 8, the handle 31 may then be pulled outwardly to the dash line position thereof at 31b. This corresponds to the position of the device wherein the element 19 has been pulled forwardly thereupon causing a concurrent shifting of the actuating fork 16 and a movement of the transmission gear 14. It is thus the same longitudinal pulling movement of the rod 26 by the remotely positioned handle 31 that causes the transmission shifting. However, the forks 16 and 17 are optionally shifted by this movement depending on whether the locking element 33 is up or down.

It will be apparent that herein is provided an effective means of remotely shifting a transmission. The operator need only effect a rotation of the remotely positioned handle 31 and thereupon pull or push the handle to accomplish the shifting of one of the transmission forks 16 or 17 and thereupon after pushing the handle inwardly the handle may be rotated and then pulled outwardly and/or pushed inwardly to effect a shifting of the other of the forks 16 or 17. One of the primary features of the invention lies in the means for effecting a tie-up between the handle 31 and either of the slidable elements 19 or 21 depending upon the positioning of the anchor-shaped locking element 33. Also the relationship between the rotation of the element 33 and the locking pin 39 is such that the locking pin is always in engagement with the element 19 or 21 which is not in engagement with the element 33 thereby providing for an effective and automatic locking means of the one element when the other element is being moved longitudinally by a pulling of the handle 31.

When either of the elements 19 or 21 is moved relative to one another along their respective mounting shafts 24 and 25 it is desirable to have some indication of the exact positioning of that element at the remote station where the device is operated. In order to accomplish or transmit this knowledge of position to the remotely stationed operator the elements 19 and 21 are indexed as shown in Figures 2, 3 and 4 by spring biased or yieldably mounted balls which engage suitable notches or indentations in the riding shafts 24 and 25 of the supporting structure. A tubular-shaped boss or bushing 65 is formed on the wall 44 of the element 19 and has an opening 66 therein. This opening 66 houses a ball type detent 67 which engages any one of three concave depressions 68, 69 or 70 in the shaft 24 as clearly shown in Figure 2. A spring 71 urges the ball toward the shaft 24 and thus into engagement with one of the three notches 68, 69 or 70. A bolt or screw member 72 threadedly engages the internal bore 66 of the boss 65 and thus holds the spring 71 against the ball 67 in a constant spring biased condition. A split-type lock washer 73 is disposed between the top of the boss 65 and the underside of the cap of the screw 72 so that when the screw or bolt 72 is turned up tightly against the member 19 the entire device is held in unitary position. The construction of the detent means for the lower element 21 is identical to the detent means employed for the element 19. Here a ball 74 has a backing spring 75 mounted within a cylindrical boss 76 on the side of the element 21 and a holding screw or bolt 77 threadedly engages a bore 78 within the boss 76 thereupon holding the spring in compressed relationship with the ball 74 whereupon the ball is urged toward a seating position in any one of the curved or concave notches 79, 80 or 81 as shown in Figure 2. The notches 79, 80 and 81 are formed in the shaft 25 on and about which the element 21 may have sliding movement. A split lock washer 82 comparable to the washer 73 tends to lock the screw 77 in fixed position with respect to the member 21 whereupon the detent unit remains fixed with the element 21.

Numerous details of construction may be varied throughout a wide range without departing from the principles disclosed herein and we, therefore, do not propose limiting the patent granted hereon otherwise than as necessitated by the appended claims.

What is claimed is:

1. A remote control gear shift mechanism comprising a supporting structure, spaced apart rod members forming a part of said supporting structure, a slidable element mounted on each of said rod members, said slidable elements substantially facing each other at adjoining sides, frame means forming part of said supporting structure interposed between said slidable elements, an actuator member positioned centrally between said slidable elements and in said frame means, said actuator member having a hub portion, a shaft journally mounted in said supporting structure for slidable movement therein, said shaft fixedly engaging the hub portion of said actuator member, said actuator member having an outwardly extending portion from said hub and arranged and constructed to engage either of the slidable elements upon rotation of the shaft member, means in each of said slidable elements to receive said actuator member whereby said actuator member in engagement with one of said slidable elements may be moved longitudinally to effect a longitudinal sliding movement of the element engaged, said extended portion of the actuator member being semi-circular in shape and defining oppositely disposed shoulders on the under side of the semi-circular portion, and a locking pin slidable vertically in said means intermediate the slidable elements, and said locking pin arranged and constructed to be moved by either of the shoulders of the actuating member whereby when the actuating member is in engagement with one element the shoulders will have pushed the locking pin into engagement with the other of said slidable elements to thereupon fixedly maintain the position of the one element while the other element may be moved along the supporting structure.

2. A device as set forth in claim 1 in which said slidable elements have flanges extending outwardly from adjacent said actuator means to receive the actuator member whereby the locking pin is held in locking association with one of said slidable elements during movement of the other of said slidable elements by said flanges.

3. A device as set forth in claim 1 in which the means receiving the actuating member comprises a front wall for said element, a rearwardly extending flange on said front wall to maintain the desired locking position of the locking pin when the other elements and the actuating member are moved longitudinally relative thereto, and said flange having an opening therethrough for passage of said locking pin from one element or the other.

4. A remote control gear shift mechanism comprising a supporting structure, spaced apart rod members forming a part of said supporting structure, a slidable element mounted on each of said rod members, said slidable elements substantially facing each other at adjoining sides, frame means forming part of said supporting structure interposed between said slidable elements, an actuator member positioned centrally between said slidable elements and in said frame means, said actuator member having a hub portion, a shaft journally mounted in said supporting structure for slidable movement therein, said shaft fixedly engaging the hub portion of said actuator member, said actuator member having an outwardly extending portion from said hub and arranged and constructed to engage either of the slidable elements upon rotation of the shaft member, means in each of said slidable elements to receive said actuator member whereby said actuator member in engagement with one of said slidable elements may be moved longitudinally to effect a longitudinal sliding movement of the element engaged, said supporting structure having two series of indentations therein adjacent each of said slidable elements and spring biased detent means arranged and constructed on and movable with each of said slidable elements for engaging any one of said indentations for indexing each of said slidable elements.

References Cited in the file of this patent

UNITED STATES PATENTS

| 1,630,076 | Schmidt | May 24, 1927 |
| 1,946,750 | Matthews | Feb. 13, 1934 |
| 2,188,403 | Frisby | Jan. 30, 1940 |